US009355147B2

(12) United States Patent
Braham et al.

(10) Patent No.: US 9,355,147 B2
(45) Date of Patent: May 31, 2016

(54) ACCESS PLAN FOR A DATABASE QUERY

(71) Applicant: International Business Machines Corporation, Armonk, NY (US)

(72) Inventors: Adam D. Braham, Rochester, MN (US); Andrew P. Passe, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/179,995

(22) Filed: Feb. 13, 2014

(65) Prior Publication Data

US 2015/0227584 A1 Aug. 13, 2015

(51) Int. Cl.
*G06F 17/30* (2006.01)

(52) U.S. Cl.
CPC .... *G06F 17/30469* (2013.01); *G06F 17/30466* (2013.01); *G06F 17/30442* (2013.01); *G06F 17/30498* (2013.01); *G06F 17/30536* (2013.01)

(58) Field of Classification Search
CPC ............. G06F 17/30463; G06F 17/30536; G06F 17/30466; G06F 17/30469; G06F 17/30306; G06F 17/30474
USPC ......... 707/716, 637, 688, 713, 714, 718, 719, 707/715
See application file for complete search history.

(56) References Cited

U.S. PATENT DOCUMENTS

| | | | | |
|---|---|---|---|---|
| 7,509,311 B2 * | 3/2009 | Galindo-Legaria | G06F 17/30463 | 707/999.003 |
| 8,185,519 B2 * | 5/2012 | Chaudhuri | ........ G06F 17/30463 | 707/714 |
| 8,200,660 B2 * | 6/2012 | Birdsall | ............ G06F 17/30463 | 706/12 |
| 8,572,068 B2 * | 10/2013 | Graefe | .............. G06F 17/30463 | 707/718 |
| 8,671,091 B2 * | 3/2014 | Cherniack | ......... G06F 17/30457 | 707/606 |
| 8,898,142 B2 * | 11/2014 | Al-Omari | ......... G06F 17/30463 | 707/713 |
| 9,110,949 B2 * | 8/2015 | Milenova | .......... G06F 17/30442 |
| 9,141,664 B2 * | 9/2015 | Mitchell | ............. G06F 17/30404 |
| 2004/0146285 A1 | 7/2004 | Matsui et al. | | |
| 2008/0306903 A1 * | 12/2008 | Larson | .............. G06F 17/30536 | 707/999.002 |
| 2011/0016157 A1 | 1/2011 | Bear et al. | | |
| 2012/0330880 A1 * | 12/2012 | Arasu | ............... G06F 17/30466 | 706/52 |

OTHER PUBLICATIONS

Anonymous, "System Design and Architecture for Mapping Multiple and Independent Security Context Based Access Control in a RDBMS Engine," Ip.com Prior Art Database Technical Disclosure. Ip.com No. IPCOMM223773D, published Nov. 29, 2012.

Ballard, C., et al., "Enabling Robust Business Analytics with InfoSphere Warehouse Cubing Services", IBM Redbooks, 2009. 34 pages. © Copyright IBM Corp. 2009.

(Continued)

*Primary Examiner* — Dangelino Gortayo
(74) *Attorney, Agent, or Firm* — Scott A. Berger

(57) ABSTRACT

A system and method of creating an access plan for a database query is disclosed. The system and method include identifying a first portion of a column of a table of a database. The first portion of the column may be in a select statement of the database query. The system and method include estimating a first statistical value for the column. The estimating may occur by analyzing a second portion of the column. The system and method include generating the access plan to predict a characteristic of a set of results for the database query. In generating the access plan, the first statistical value for the column may be used.

10 Claims, 5 Drawing Sheets

(56) References Cited

OTHER PUBLICATIONS

Siemens, AG., et al., "Method for Column-Based Historical Information System Data Access," Ip.com Prior Art Database Technical Disclosure, Ip.com No. IPCOM000200042D. Original Publication Oct. 12, 2010. Ip.com Electric Publication Sep. 24, 2010. Copyright Siemens AG 2010.

Stodder, D. "Achieving Greater Agility with Business Intelligence," TDWI Best Practices Report, First Quarter 2013. 40 pages. TDWI.org © 2013 by TDWI (The Data Warehousing InstituteTM), a division of 1105 Media, Inc.

* cited by examiner

ACCESS PLAN FOR A DATABASE QUERY

TECHNICAL FIELD

This disclosure relates generally to database management systems and, more particularly, relates to database queries.

BACKGROUND

Databases are used to store information for numerous types of applications. Examples include various industrial, commercial, technical, scientific, and educational applications. Database management systems (DBMSs) are a typical mechanism for accessing data stored in a database. DBMSs are typically configured to separate the process of storing data from accessing, manipulating, or using data stored in a database. DBMSs often require tremendous resources to handle the heavy workloads placed on such systems. As such, it may be useful to increase the performance of database management systems with respect to processing searches, or queries, to databases.

SUMMARY

Aspects of the disclosure include a system and method of creating an access plan for a database query. The system and method include identifying a first portion of a column of a table of a database. The first portion of the column may be in a select statement of the database query. The system and method include estimating a first statistical value for the column. The estimating may occur by analyzing a second portion of the column. The system and method include generating the access plan to predict a characteristic of a set of results for the database query. In generating the access plan, the first statistical value for the column may be used.

Aspects of the disclosure may reduce CPU consumption and may promote efficient query performance. The first statistical value for the column may include cardinality for the column (e.g., number of unique values in the column). In embodiments, selectivity may be the first statistical value for the column. Selectivity (e.g., ratio of distinct values to the number of entries) may be the characteristic of the set of results for the database query. The characteristic of the set of results for the database query may include a number of rows.

Aspects of the disclosure include using an analytics engine to estimate, by analyzing the second portion of the column, the first statistical value for the column. Data from the table of the database may be transmitted to the analytics engine. A specific query related to data from the table of the database may be transmitted to the analytics engine. The specific query may be resolved by the analytics engine. Resolving the specific query may include comparing a corpus and data from the table of the database. The first statistical value for the column may be determined by the analytics engine in response to resolving the specific query.

DETAILED DESCRIPTION

Figure 1:
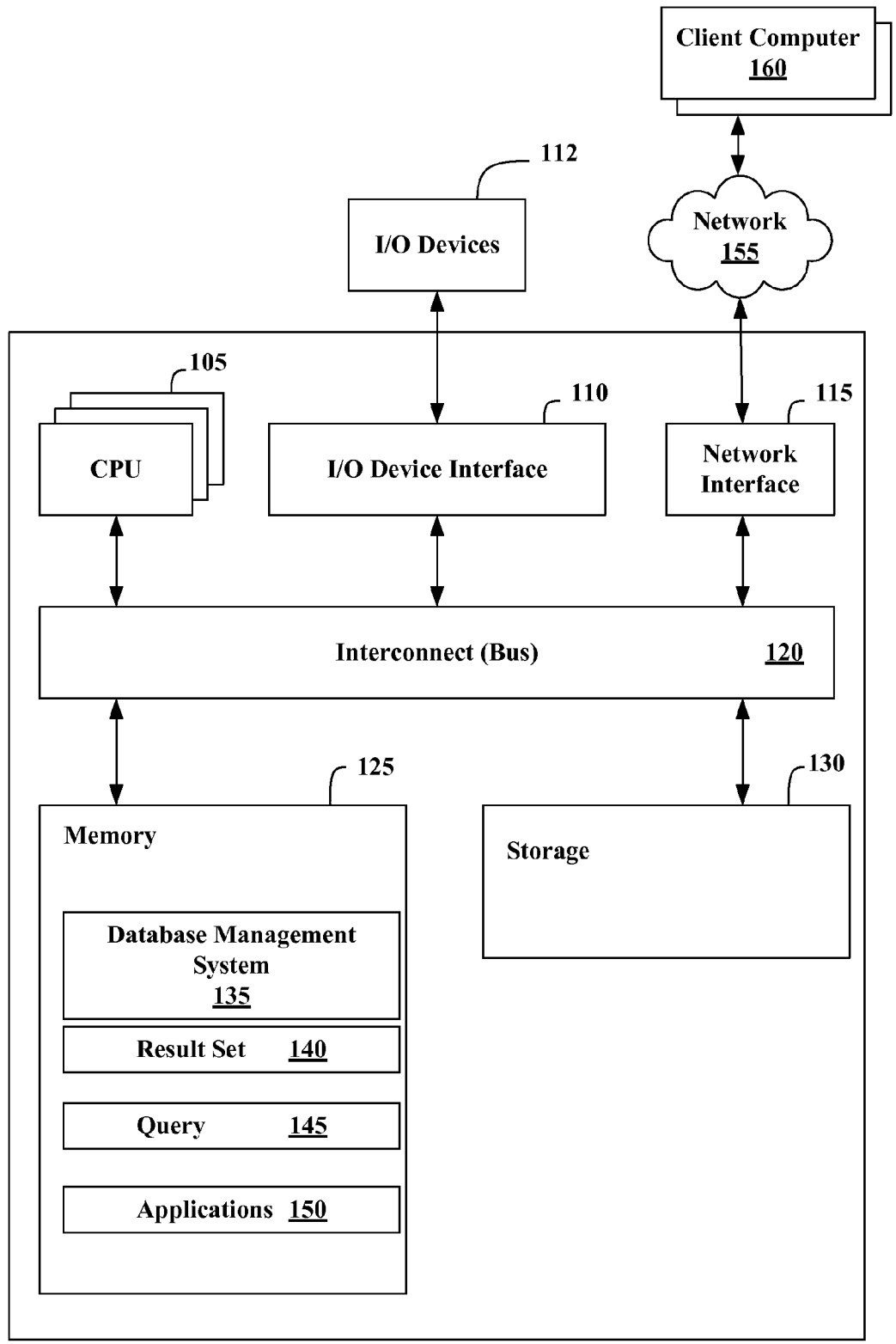
FIG. 1 illustrates an example representation of a computer system connected to a client computer via a network according to an embodiment.

Aspects of the disclosure leverage data analytics to provide certain features/answers about a data set previously available principally through use of statistics. Usable statistics can take a significant amount of time and resources to collect and may not be available for use as soon as requested. A data analytics approach may reduce maintenance and decrease reliance on specific data values in the data set at the time of a query. When statistics are unavailable or costly, at least a portion of the data set can be analyzed to classify data and estimate characteristics of data.

Development efforts have been directed toward query "optimization," whereby the execution of particular searches, or queries, is optimized in an automated manner to minimize the amount of resources required to execute each query. A query optimizer typically generates, for each submitted query, an access plan. In generating an access plan, a query optimizer typically creates multiple potential access plans, and selects the best among those potential access plans based at least in part upon the "cost" of each plan. Querying a large amount of data may take an amount of time and performance overhead that is not insignificant. The cost of each plan can represent the amount of resources expected to be utilized by the plan (typically expressed in the expected amount of time to execute), and as such, selecting the plan with the lowest cost typically results in the most efficient (and quickest) execution of a query. When statistics are not available or useful, the query optimizer may make assumptions or simply produce a guess in generating a particular access plan. Using data analytics may have a positive impact relative to such assumptions or guesses.

Aspects of the disclosure include a system and method of creating an access plan for a database query. The system and method include identifying a first portion of a column of a table of a database. The first portion of the column may be in a select statement of the database query. The system and method include estimating a first statistical value for the column. The estimating may occur by analyzing a second portion of the column. The system and method include generating the access plan to predict a characteristic of a set of results for the database query. In generating the access plan, the first statistical value for the column may be used.

Aspects of the disclosure may include the first statistical value for the column including cardinality for the column (e.g., number of unique values in the column). In embodiments, selectivity may be the first statistical value for the column. Selectivity (e.g., ratio of distinct values to the number of entries) may be the characteristic of the set of results for the database query. The characteristic of the set of results for the database query may include a number of rows. In embodiments, the database query may include a join. The characteristic of the set of results for the database query may include an expected join count related to the number of rows.

In embodiments, analyzing the second portion of the column may include comparing the second portion of the column to profile data. In embodiments, a column header may be at least a part of the second portion of the column. In embodiments, analyzing the second portion of the column may include determining a measure of correlation of the column with another column of the table of the database that is persistently (or permanently) related to the column (e.g., states and zip codes). In embodiments, analyzing the second portion of the column may include classifying the second portion of the column into a category. Aspects of the disclosure include using an analytics engine to estimate, by analyzing the second portion of the column, the first statistical value for the column. Data from the table of the database may be transmitted to the analytics engine. A specific query related to data from the table of the database may be transmitted to the analytics engine (e.g., for natural language processing). The specific query may be resolved by the analytics engine (e.g., using natural language processing). Resolving the specific query may include comparing a corpus (e.g., data store) and data from the table of the database. The first statistical value for the column may be determined by the analytics engine in response to resolving the specific query.

Aspects of the disclosure may include determining a statistics table is unsuitable for creating the access plan for the database query. The statistics table may be unsuitable in response to at least one of one of a group selected from an absence of the statistics table (e.g., no statistics table has been built), an absence of records in the statistics table (e.g., a statistics table has been built but the statistics table contains no records), reaching a threshold burden of computing resources used for accessing the statistics table (e.g., using computing resources to access the statistics table is not feasible in a computing environment), or a user choice to not utilize the statistics table (e.g., a database administrator makes a professional judgment or business decision such as deeming information in the statistics table to be insufficient or unreliable such as being out of date and too old). Aspects of the disclosure may reduce CPU consumption. Aspects of the disclosure may promote efficient query performance.

FIG. 1 illustrates an example representation of a computer system 100 connected to one or more client computers 160 via a network 155, according to some embodiments. For the purposes of this disclosure, computer system 100 may represent practically any type of computer, computer system, or other programmable electronic device, including but not limited to, a client computer, a server computer, a portable computer, a handheld computer, an embedded controller, etc. In some embodiments, computer system 100 may be implemented using one or more networked computers, e.g., in a cluster or other distributed computing system.

The computer system 100 may include, without limitation, one or more processors (CPUs) 105, a network interface 115, an interconnect 120, a memory 125, and a storage 130. The computer system 100 may also include an I/O device interface 110 used to connect I/O devices 112, e.g., keyboard, display, and mouse devices, to the computer system 100.

Each processor 105 may retrieve and execute programming instructions stored in the memory 125 or storage 130. Similarly, the processor 105 may store and retrieve application data residing in the memory 125. The interconnect 120 may transmit programming instructions and application data between each processor 105, I/O device interface 110, network interface 115, memory 125, and storage 130. The interconnect 120 may be one or more busses. The processor 105 may be a single central processing unit (CPU), multiple CPUs, or a single CPU having multiple processing cores in various embodiments. In one embodiment, a processor 105 may be a digital signal processor (DSP).

The memory 125 may be representative of a random access memory, e.g., Static Random Access Memory (SRAM), Dynamic Random Access Memory (DRAM), read-only memory, or flash memory. The storage 130 may be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 115 may be configured to transmit data via the communications network 155.

The memory 125 may include a database management system (DBMS) 135, a result set 140, a query 145, and applications 150. Although these elements are illustrated as residing in the memory 125, any of the elements, or combinations thereof, may reside in the storage 130 or partially in the memory 125 and partially in the storage 130. Each of these elements will be described in greater detail in accordance with FIG. 2.

The network 155 may be any suitable network or combination of networks and may support any appropriate protocol suitable for communication of data and/or code to/from the server computer system 100 and the client computer system 160. In some embodiments, the network 155 may support wireless communications. In other embodiments, the network 155 may support hardwired communications. The network 155 may be the Internet and may support Internet Protocol in some embodiments. In other embodiments, the network 155 may be implemented as a local area network (LAN) or a wide area network (WAN). The network 155 may also be implemented as a cellular data network. Although the network 155 is shown as a single network in the figures, one or more networks of the same or different types may be included.

The client computer system 160 may include some or all of the hardware and software elements of the computer system 100 previously described. As shown, there may be one or more client computers 160 connected to the computer system 100 via the network 155. In some embodiments, one or more client computers 160 may send a query 145 by network 155 to computer system 100 and receive a result set 140.

Figure 2:
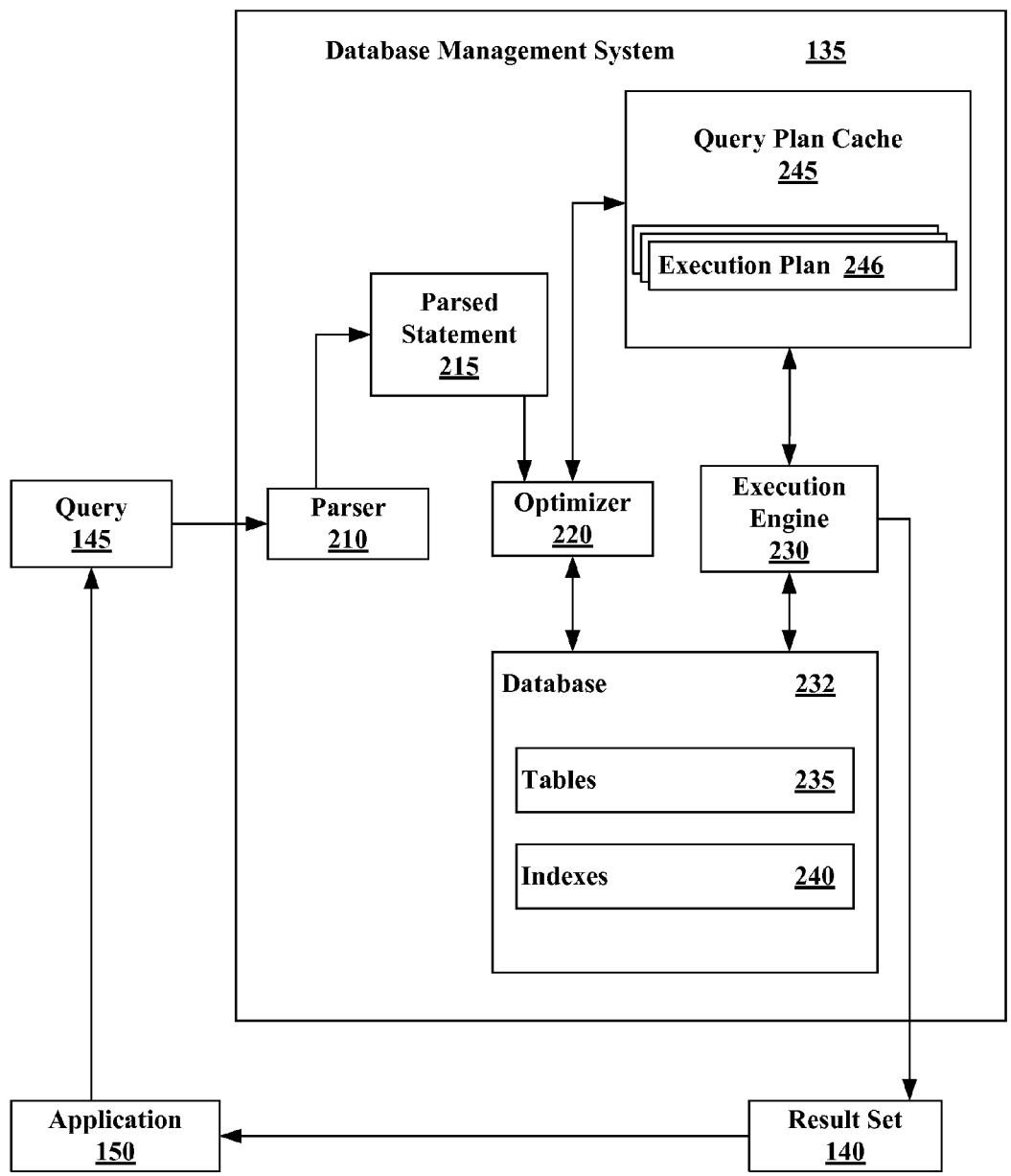
FIG. 2 illustrates an example database management system (DBMS) according to an embodiment.

FIG. 2 illustrates an example database management system (DBMS) 135. The DBMS 135 may include a parser 210, an optimizer 220, an execution engine 230, and a database 232. The parser 210 may receive a database query 145 from an application 150. In some embodiments, the database query 145 may be in the form of a Structured Query Language (SQL) statement. The parser 210 may generate a parsed statement 215. The parser 210 may send the parsed statement 215 to an optimizer 220. The optimizer 220 may attempt to optimize the parsed statement. In some embodiments, optimizing may improve the performance of the database query 145 by, for example, reducing the amount of time it takes to provide a user with a response. The optimizer 220 may generate an execution plan 246 (access plan), which may be maintained in a query plan cache 245, according to some embodiments. The query plan cache 245 may include one or more execution plans 246, including the current execution plan as well as previously used execution plans. Once an execution plan 246 is generated, the execution plan 246 may be sent to the execution engine 230. The execution engine 230 may execute the query 145. Executing the query 145 may include finding and retrieving data in the database tables 235 that satisfies the criteria supplied in the query 145. The execution engine 230 may store the data returned matching the query 145 in a result set 140. The DBMS 135 may return the result set 140 to an application 150, such as the application in which the database query 145 was generated, as a response to the database query 145.

A database 232 may include one or more tables 235 and, in some embodiments, one or more indexes 240. A database table 235 may organize data into rows and columns. Each row of a database table 235 may correspond to an individual entry, a tuple, or a record in the database 232. A column may define what is stored in each entry, tuple, or record. In some embodiments, columns of a table 235 may also be referred to as fields or attributes. Each table 235 within the database 232 may have a unique name. Each column within a table 235 may also have a unique name. A row, tuple, or record, however, within a particular table 235 may not be unique, according to some embodiments. A database 232 may also include one or more indexes 240. An index 240 may be a data structure that may inform the DBMS 135 of the location of a particular record within a table 235 if given a particular indexed column value. In some embodiments, the execution engine 230 may use the one or more indexes 240 to locate data within a table 235. In other embodiments, the execution engine 230 may scan the tables 235 without using an index 240.

To facilitate the optimization of queries, DBMS 135 may also include a statistics manager. The statistics manager may be used to gather and analyze statistical information for the optimizer 220. The statistical information may be derived by the statistics manager from by using and/or creating indexes and column statistics. These column statistics may be merged during optimization to estimate a join fanout. The statistics manager may also identify join networks and detect skew values. To assist in generating an optimal access plan, query optimizer 220 can be configured to communicate with and receive communication from statistics manager. It will be appreciated, however, that the query optimizer and statistics manager may be allocated different functionality in embodiments. Moreover, the statistics manager may be contained or integrated within the query optimizer. The statistics manager may also have other components or may be omitted completely in some embodiments. Furthermore, other components and functionality may also be incorporated into DBMS 135, as may other suitable database management architectures. Other database programming and organizational architectures may also be used consistent with embodiments.

Figure 3:
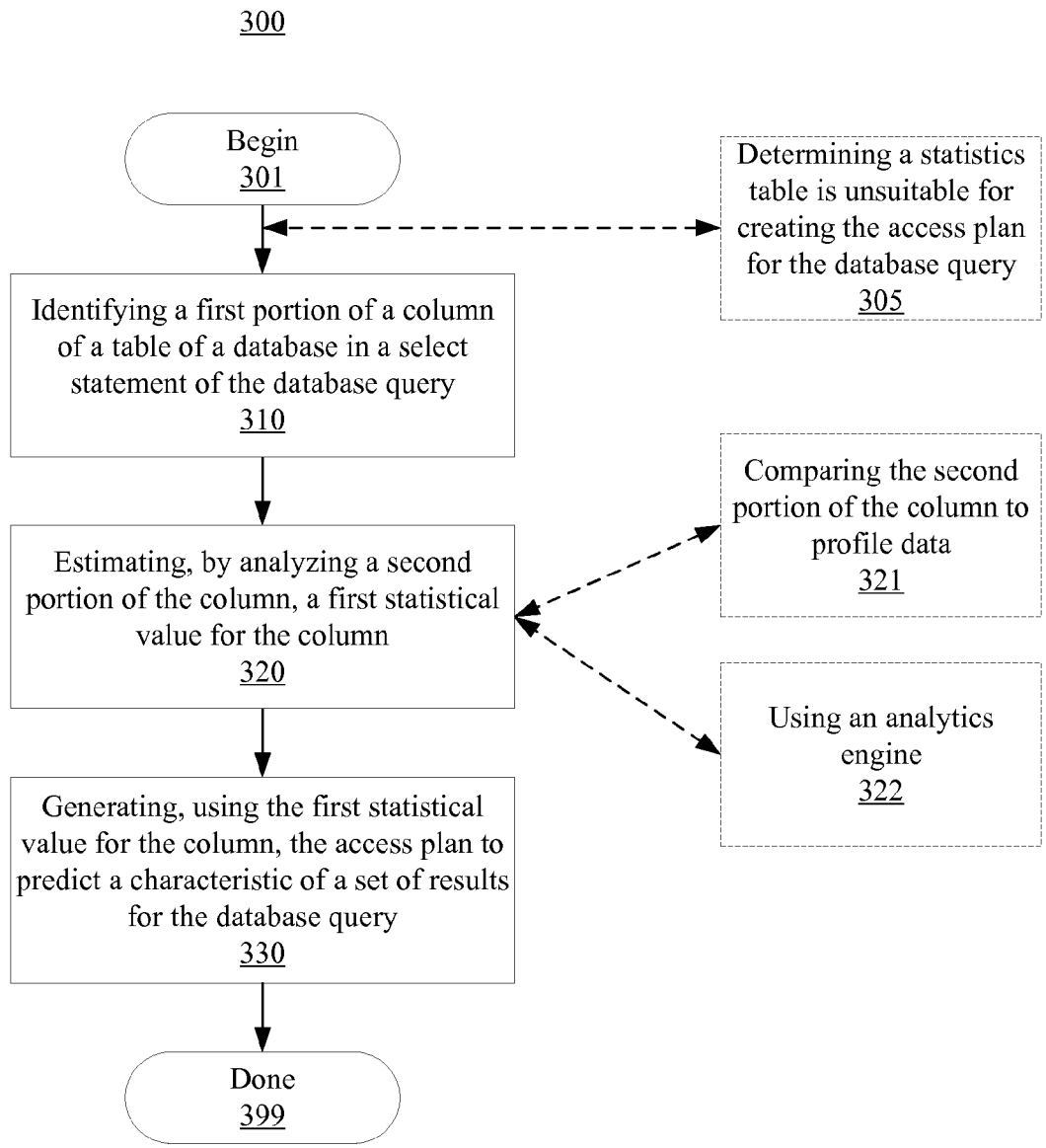
FIG. 3 is a flowchart illustrating a method to create an access plan for a database query according to embodiments.

FIG. 3 is a flowchart illustrating a method 300 to create an access plan for a database query according to embodiments. The method 300 begins at block 301. In embodiments, the method may include determining a statistics table is unsuitable for creating the access plan for the database query at block 305. The statistics table may be unsuitable in response to an absence of the statistics table (e.g., no statistics table has been built). For example, general system performance concerns led to disablement of building the statistics table. The statistics table may be unsuitable in response to an absence of records in the statistics table (e.g., a statistics table has been built but the statistics table contains no records). For example, table data is newly fresh and maintenance operations have yet to populate the statistics table but query capability is requested. The statistics table may be unsuitable in response to reaching a threshold burden of computing resources used for accessing the statistics table (e.g., using computing resources to access the statistics table is not feasible in a computing environment). For example, during peak hours energy consumption is at a premium and operations related to statistics tables may occur (only) during off-peak hours. The statistics table may be unsuitable in response to a user choice to not utilize the statistics table (e.g., a database administrator makes a professional judgment or business decision such as deeming information in the statistics table to be insufficient or unreliable). For example, the database administrator believes data in the statistics table may be distorted due to, for instance, periodic downtime or lag-time of certain servers.

At block 310, the method includes identifying a first portion of a column of a table of a database. The first portion of the column may include a column header. The first portion of the column may include a field of a row (and thus may include fields of many rows). The first portion of the column may be in a select statement of the database query. For example, the select statement may be: "where column2header=valueoffieldofcolumn2row3." As a more particular example, the select statement may be: "where State=MT" (put differently, where the U.S. State is Montana).

At block 320, the method includes estimating a first statistical value for the column. The first statistical value may be a parameter (i.e., a numerical or other measurable factor forming one of a set that defines a system or sets the conditions of its operation). The first statistical value for the column may include cardinality for the column. Cardinality may include the number of distinct values (e.g., different/unique values). For example a table with a column State in the United States has 50 possible values and thus cardinality of that column is 50. Cardinality may be considered high (very uncommon), normal (somewhat uncommon or a variety of possibilities), or low (mostly the same values). In embodiments, selectivity may be the first statistical value for the column. Selectivity may be calculated using cardinality (e.g., as at least part of the computation). Selectivity may include a likelihood of finding a match (e.g., variation) or how many different values are available in a given sample set. For instance, determining selectivity may assist the query optimizer in deciding whether to use a first index to find certain rows in a table, to use a second index, to use a third index, or to simply use the table.

The estimating may occur by analyzing a second portion of the column. The second portion of the column may include a column header (put differently, the column header may be at least a part of the second portion of the column). The second portion of the column may include a field of a row (and thus may include fields of many rows). It is possible that the first and second portions of the column are identical, though in many instances they may be at least slightly different. For example, the second portion of the column could include the column header "State" and also field values "MN," "NM," "NY," "OH," and "OK." Different permutations or combinations may lead to distinct analyses. For example, only analyzing the column header "State" could refer to a state of being, a physical state (e.g., solid, liquid, gas), or many other states. Only analyzing the fields "OH" and "OK" could refer to a column of two letter words. Only analyzing "MN" and "NM" could refer to consecutive letters in the alphabet. Only analyzing "NY" could refer to shorthand for not yet. Only analyzing the column header "State" and the field "OK" could refer to the state of feelings of a person. Distinct cardinalities and selectivities may result from each of these scenarios. A data analytics approach may provide efficiencies in estimating the first statistical value for the column.

In embodiments, analyzing the second portion of the column may include comparing the second portion of the column to profile data at block 321. For example, comparing field values "MN," "NM," "NY," "OH," and "OK" with profile data include sets of known abbreviations or sets of data known to be collected for certain tables (e.g., identifications). In embodiments, analyzing the second portion of the column may include determining a measure of correlation of the column with another column of the table of the database that is persistently related to the column. For example, the column having state information may highly correlate to another column having zip codes. Such columns may be persistently or even permanently related. Ranges of correlation may occur, and data analytics may recognize an amount of correlation to provide more efficient estimates for statistical values. In embodiments, analyzing the second portion of the column may include classifying the second portion of the column into a category. For example, if another column includes "49401," "55901," and "87123," then it may be classified as having a zip code category.

Aspects of the disclosure include using an analytics engine at block 322 to estimate, by analyzing the second portion of the column, the first statistical value for the column. Data from the table of the database may be transmitted to the analytics engine. A specific query related to data from the table of the database may be transmitted to the analytics engine (e.g., for natural language processing which may identify one or more concepts associated with the different elements in the specific query and use these concepts to filter though the different data sources stored in a corpus). The specific query may be resolved by the analytics engine (e.g., using natural language processing which may evaluate the specific query to identify a data source that may contain an answer to the specific query). Resolving the specific query may include comparing the corpus (e.g., data store of journals, websites, magazines, reference books, textbooks that may have been ingested) and data from the table of the database. The first statistical value for the column may be determined by the analytics engine in response to resolving the specific query. For example, "MN," "NM," "NY," "OH," and "OK" may be resolved as state abbreviations and the first statistical value may be cardinality which would be 50. Without the analytics engine, permutations or combinations of two letters may have led to a much different first statistical value. The effect of the much different first statistical value could impede efficiency and the use of computing resources in performing the database query.

At block 330, the method includes generating the access plan to predict a characteristic of a set of results for the database query. In generating the access plan, the first statistical value for the column may be used. In embodiments, cardinality may be used. Cardinality may be used as at least a component in determining selectivity. In embodiments, selectivity may be the characteristic of the set of results for the database query. The characteristic of the set of results for the database query may include a number of rows. In embodiments, the database query may include a join. The characteristic of the set of results for the database query may include an expected join count related to the number of rows.

Consider the following example. Every day, a database administrator builds a new set of tables, based on data in other "permanent" tables. The database administrator then use this new set of tables to run a set of queries. Since the database administrator builds a new copy of the set of tables every day, the database administrator does not want to build indexes (because that takes a significant amount of time). Without method 300, the database administrator has a challenge with a two-way join between two tables of the new set of table—a first table which is very large and a second table which is very small. Since both tables are newly fresh, statistics have not been collected in a statistics table. Without method 300, a default cardinality for the join column is issued and an expected join record count of roughly 100 million rows is predicted. The optimizer ultimately chooses to put the smaller second table first in the join order, followed by the larger second table under a hash probe. Under these conditions, the query runs in approximately 3 minutes (180 seconds). However, using data analytics of method 300, the query may be run a second time under like conditions. Cardinality of 14 million may be arrived at for the first statistical value. With this cardinality, an expected join count of only 27 rows is predicted. In actuality, the real join count is 8. Therefore, the data analytics approach may produce a better estimate. With the better estimate, the optimizer chooses a plan placing the larger first table first uses look ahead predicate generation. With this plan using method 300, the query runs in approximately 3 seconds (or approximately 6000% more efficient than not using method 300).

Method 300 may conclude at block 399. Method 300 may reduce CPU consumption. Method 300 may be used when statistics are unavailable or costly. Method 300 may be used when at least a portion of the data set can be analyzed to classify data and estimate characteristics of data. Method 300 may promote efficient query performance.

Figure 4:
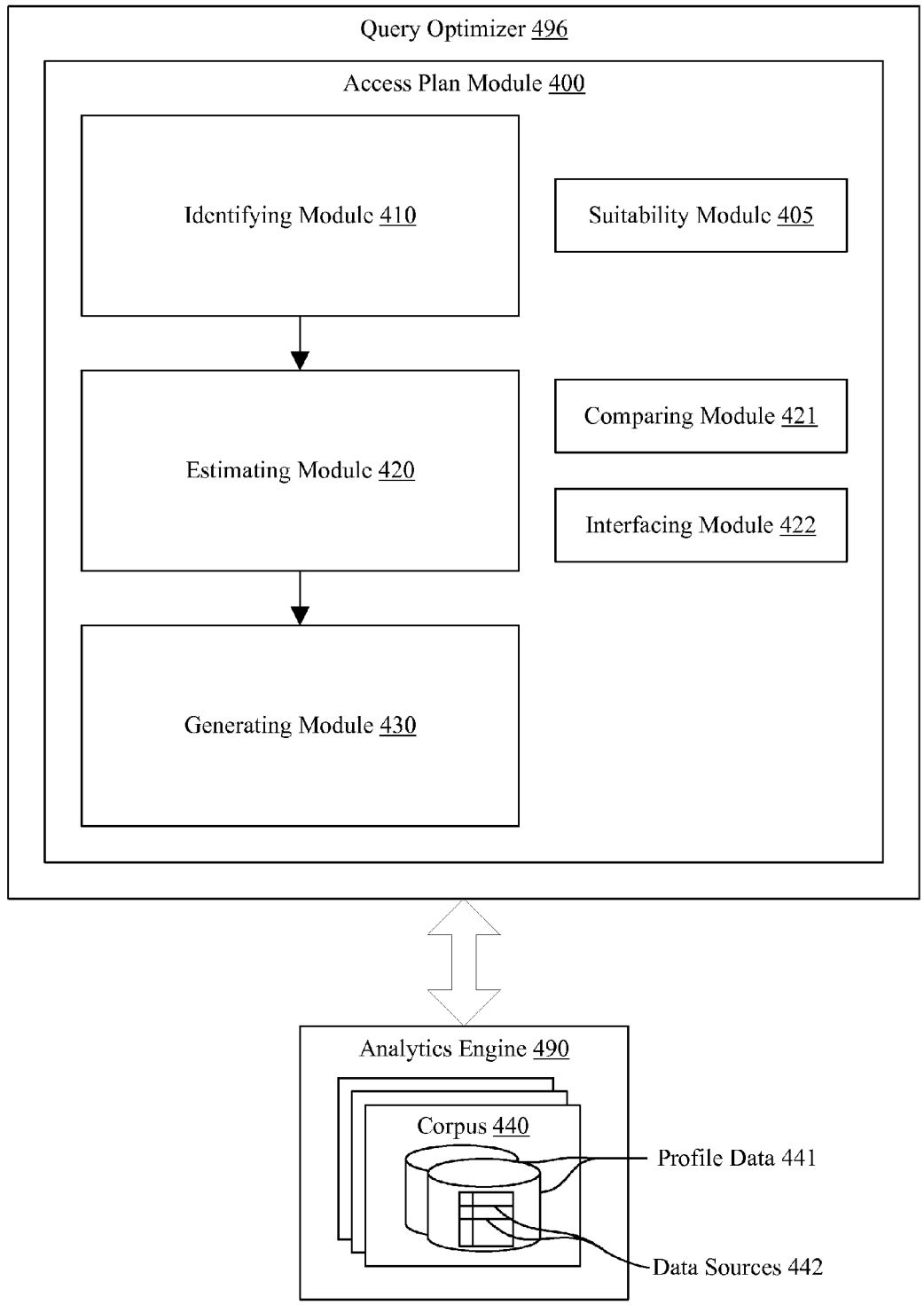
FIG. 4 shows modules of a system for creating an access plan for a database query according to embodiments.

FIG. 4 shows modules of a system for creating an access plan for a database query according to embodiments. In embodiments, aspects of method 300 may be consistent with and/or implemented using one or more modules of FIG. 4 (particular aspects may be similar or the same). The modules may be implemented in hardware, software or firmware executable on hardware, or a combination thereof. For example, module functionality that may occur in a query optimizer 496 may actually be implemented in an analytics engine 490 and vice versa. Other functionality may be distributed across the query optimizer 496 and the analytics engine 490.

The query optimizer 496 may include an access plan module 400. The access plan module 400 may be configured and arranged to create the access plan for the database query. The access plan module 400 may include an identifying module 410, an estimating module 420, and a generating module 430. The access plan module 400 may further include a suitability module 405, a comparing module 421, and an interfacing module 422. The analytics engine 490 may have a corpus 440 comprising profile data 441 having data sources 442.

In embodiments, the access plan module 400 may include determining a statistics table is unsuitable for creating the access plan for the database query by the suitability module 405. The statistics table may be unsuitable in response to an absence of the statistics table (e.g., no statistics table has been built). The statistics table may be unsuitable in response to an absence of records in the statistics table (e.g., a statistics table has been built but the statistics table contains no records). The statistics table may be unsuitable in response to reaching a threshold burden of computing resources used for accessing the statistics table (e.g., using computing resources to access the statistics table is not feasible in a computing environment). The statistics table may be unsuitable in response to a user choice to not utilize the statistics table (e.g., a database administrator makes a professional judgment or business decision such as deeming information in the statistics table to be insufficient or unreliable).

The identifying module 410 includes identifying a first portion of a column of a table of a database. The first portion of the column may include a column header. The first portion of the column may include a field of a row (and thus may include fields of many rows). The first portion of the column may be in a select statement of the database query.

The estimating module 420 includes estimating a first statistical value for the column. The first statistical value may be a parameter (i.e., a numerical or other measurable factor forming one of a set that defines a system or sets the conditions of its operation). The first statistical value for the column may include cardinality for the column. Cardinality may include the number of distinct values (e.g., different/unique values). Cardinality may be considered high (very uncommon), normal (somewhat uncommon or a variety of possibilities), or low (mostly the same values). In embodiments, selectivity may be the first statistical value for the column. Selectivity may be calculated using cardinality (e.g., as at least part of the computation). Selectivity may include a likelihood of finding a match (e.g., variation) or how many different values are available in a given sample set. For instance, determining selectivity may assist the query optimizer in deciding whether to use a first index to find certain rows in a table, to use a second index, to use a third index, or to simply use the table.

The estimating by the estimating module 420 may occur by analyzing a second portion of the column. The second portion of the column may include a column header (put differently, the column header may be at least a part of the second portion of the column). The second portion of the column may include a field of a row (and thus may include fields of many rows). It is possible that the first and second portions of the column are identical, though in many instances they may be at least slightly different. Different permutations or combinations may lead to distinct analyses. A data analytics approach may provide efficiencies in estimating the first statistical value for the column.

In embodiments, analyzing the second portion of the column may include comparing the second portion of the column to profile data 441 using a comparing module 421 (in embodiments, the profile data 441 is not necessarily part of the analytics engine 490). In embodiments, analyzing the second portion of the column may include determining a measure of correlation of the column with another column of the table of the database that is persistently related to the column. Such columns may be persistently or even permanently related. Ranges of correlation may occur, and data analytics may recognize an amount of correlation to provide more efficient estimates for statistical values. In embodiments, analyzing the second portion of the column may include classifying the second portion of the column into a category.

The interfacing module 422 may interface with the analytics engine 490 to estimate, by analyzing the second portion of the column, the first statistical value for the column. Data from the table of the database may be transmitted to the analytics engine. A specific query related to data from the table of the database may be transmitted to the analytics engine (e.g., for natural language processing which may identify one or more concepts associated with the different elements in the specific query and use these concepts to filter though the different data sources 442 stored in a corpus 440). The specific query may be resolved by the analytics engine (e.g., using natural language processing which may evaluate the specific query to identify a data source 442 that may contain an answer to the specific query). Resolving the specific query may include comparing the corpus 440 (e.g., data store of journals, websites, magazines, reference books, textbooks that may have been ingested) and data from the table of the database. The first statistical value for the column may be determined by the analytics engine in response to resolving the specific query.

The generating module 430 may generate the access plan to predict a characteristic of a set of results for the database query. In generating the access plan, the first statistical value for the column may be used. In embodiments, cardinality may be used. Cardinality may be used as at least a component in determining selectivity. In embodiments, selectivity may be the characteristic of the set of results for the database query. The characteristic of the set of results for the database query may include a number of rows. In embodiments, the database query may include a join. The characteristic of the set of results for the database query may include an expected join count related to the number of rows.

Use of the modules described may reduce CPU consumption. Use of the modules described may be used when statistics are unavailable or costly. The modules described may be used when at least a portion of the data set can be analyzed to classify data and estimate characteristics of data. Use of the modules described may promote efficient query performance.

Figure 5:
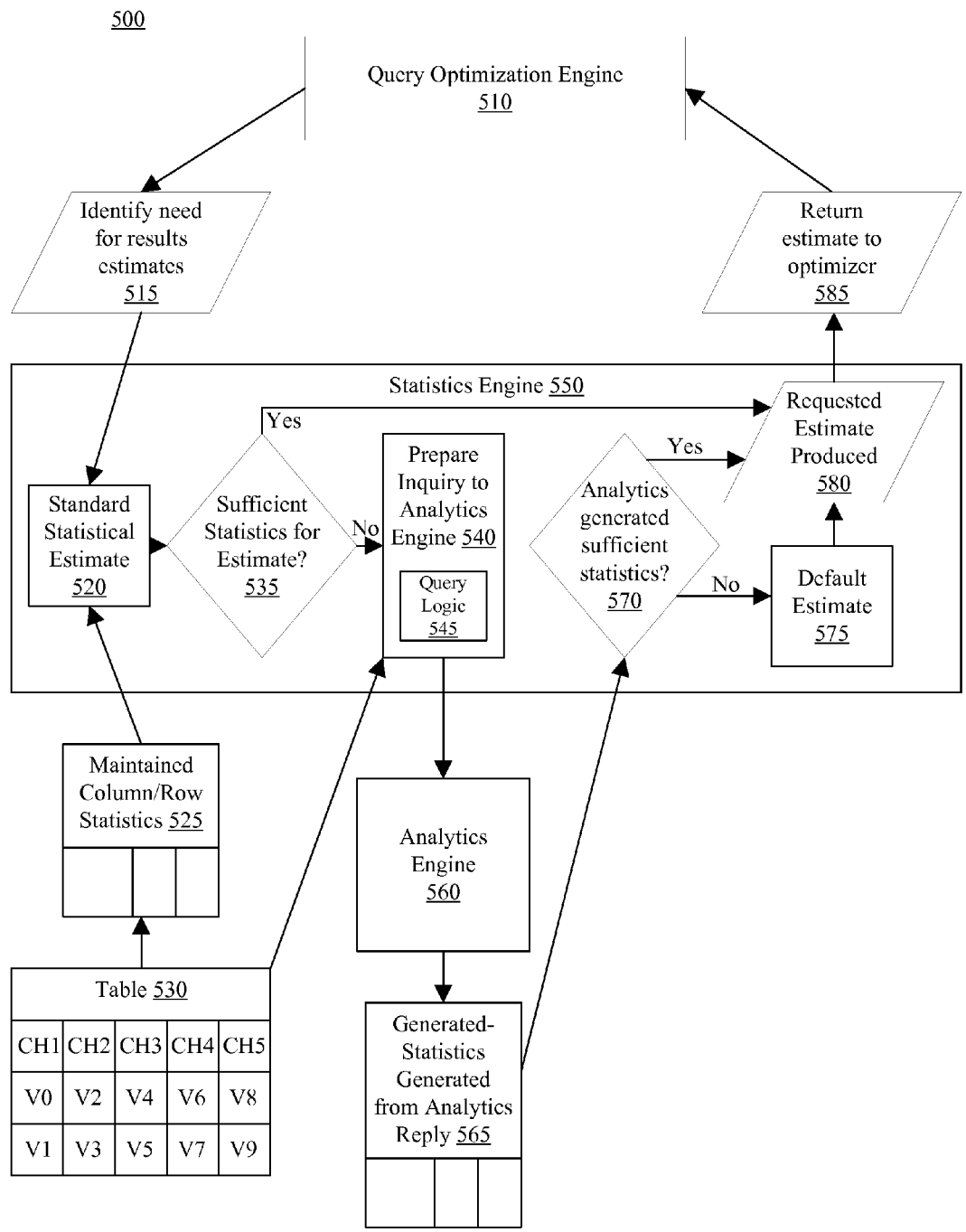
FIG. 5 is an example system for creating an access plan for a database query according to embodiments.

FIG. 5 is an example system 500 for creating an access plan for a database query according to embodiments. Aspects of system 500 may include at least a portion of previously described systems and/or aspects of method 300. A query optimization engine 510 may trigger implementation of other aspects of system 500 through identification of a need for results estimates 515 (e.g., what the data will ultimately look like). A standard statistical estimate 520 may be determined/calculated. The standard statistical estimate 520 may use maintained column/row statistics 525 which can be derived from a table 530 (the table 530 may have column headers (CHs) and values (Vs)). A first determination 535 may be made whether sufficient statistics exist for a results estimate. In response to sufficient statistics existing for the first determination 535, a requested estimate 580 is produced and a returned estimate 585 is delivered to the query optimization engine 510. For instance, sufficient statistics existing may include a threshold number of values such as 30, a proportion of values relative to a number of rows being reached such as 10%, or all of the values being within a given range. The returned estimate 585 is at least based on the requested estimate 580. In embodiments, the returned estimate 585 and the requested estimate 580 are identical.

In response to sufficient statistics not existing for the first determination 535, an inquiry 540 to an analytics engine 560 may be prepared. The table 530 may be used to extract data to assist in preparing the inquiry. Query logic 545 can assist in building the inquiry 540 (e.g., question) for the analytics engine 560. Query logic 545 may use a select statement such as "from [table] where [field] equals [value]." In embodiments, little or no data exists in the table 530 to use in building the inquiry 540.

In response to preparing the inquiry 540, the analytics engine 560 may analyze factors such as column names and data values in combination with the query logic 545. Generated-statistics 565 such as cardinality estimates may be generated from an analytics engine reply. A second determination 570 may be made whether the generated-statistics 565 generated from the analytics are sufficient. In response to sufficient statistics being generated as determined by the second determination 570, a requested estimate 580 is produced (based on the generated-statistics 565) and a returned estimate 585 is delivered to the query optimization engine 510. In response to insufficient statistics being generated as determined by the second determination 570, a default estimate 575 may be produced as the requested estimate 580 and the returned estimate 585 which is delivered to the query optimization engine 510.

Aspects such as inquiry 540 and query logic 545 may be further described utilizing specific use cases. At these points, both the data to be queried and the logic of the query statement may be read. Questions for the analytics engine 560 that can produce answers that would be used in the place of maintained statistics can be prepared. For example, a call to the analytics engine 560 that produces a value for cardinality may be prepared. The first few values of a table may be read and passed along with a request to classify these objects or find what they have in common. Values returned could include a noun (e.g., the objects are all U.S. states). Using that noun, it may be requested of the analytics engine 560 to determine how many possible values exist for the noun (e.g., 50). The result returned would be the cardinality estimate for that row.

As another example, aspects could be applied in determining a selectivity percentage. In particular, analyze an occasion where the query statement selects WHERE <column_name>=<selection_value>FROM <table_name>. Passed to the analytics engine 560 would be a request for what is the percent likelihood that <column_name>would equal <selection_value>. Consider a detailed scenario where there is a table named "Automobiles" with a list of every automobile in the world. In further detail, the table has a column named "color" and the query statement asks Select VIN from AUTOMOBILES where COLOR=RED. Without statistics the query engine would make a default guess using an arbitrary percentage. However, using the technique described, a call to the analytics engine after building the request "What percentage of <AUTOMOBILES>in the world are the <COLOR> <RED>" would produce a more accurate response. In both use cases, the time spent by the analytics engine 560 to answer the appropriate question may be less than the time lost due to not having the statistics available. These are just a couple of examples of how the technique described can be implemented.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: an object oriented programming language such as Java, Smalltalk, C++, or the like; and conventional procedural programming languages, such as the "C" programming language or similar programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the invention may be devised without departing from the basic scope thereof, and the scope thereof is determined by the claims that follow.

What is claimed is:

1. A computer-implemented method of creating an access plan for a database query, the method comprising:
   identifying a first portion of a column of a table of a database in a select statement of the database query;
   estimating, by analyzing a second portion of the column, using an analytics engine, a first statistical value for the column, the estimating including:
      receiving, by the analytics engine, data from the table of the database;
      receiving, by the analytics engine, for natural language processing, a specific query related to data from the table of the database;
      resolving, by the analytics engine, using natural language processing, the specific query, wherein resolving the specific query includes comparing a corpus and data from the table of the database; and
      determining, by the analytics engine, in response to resolving the specific query, the first statistical value for the column; and
   generating, using the first statistical value for the column, the access plan to predict a characteristic of a set of results for the database query.

2. The method of claim 1, wherein the first statistical value for the column includes cardinality for the column.

3. The method of claim 1, wherein selectivity is either the first statistical value for the column or the characteristic of the set of results for the database query.

4. The method of claim 1, wherein analyzing the second portion of the column includes comparing the second portion of the column to profile data, the second portion of the column includes a column header, and the characteristic of the set of results for the database query includes a number of rows.

5. The method of claim 1, further comprising determining a statistics table is unsuitable for creating the access plan for the database query, wherein the statistics table is unsuitable in response to at least one of one of a group selected from an absence of the statistics table, an absence of records in the statistics table, reaching a threshold burden of computing resources used for accessing the statistics table, or a user choice to not utilize the statistics table.

6. The method of claim 1, wherein analyzing the second portion of the column includes determining a measure of correlation of the column with another column of the table of the database that is persistently related to the column.

7. The method of claim 1, wherein the database query includes a join, analyzing the second portion of the column includes classifying the second portion of the column into a category, and the characteristic of the set of results for the database query includes an expected join count related to the number of rows.

8. A computer-implemented method of creating an access plan for a database query, the method comprising:
   determining a statistics table is unsuitable for creating the access plan for the database query;
   identifying a first portion of a column of a table of a database in a select statement of the database query;
   estimating, by analyzing a second portion of the column, using an analytics engine, including a column header of the column, a cardinality value for the column, the estimating including:
      receiving, by the analytics engine, data from the table of the database;
      receiving, by the analytics engine, for natural language processing, a specific query related to data from the table of the database;
      resolving, by the analytics engine, using natural language processing, the specific query, wherein resolving the specific query includes comparing a corpus and data from the table of the database; and
      determining, by the analytics engine, in response to resolving the specific query, the cardinality value for the column; and
   generating, using the cardinality value for the column, the access plan to predict a characteristic related to a number of rows of a set of results for the database query.

9. The method of claim 8, wherein selectivity is the characteristic of the set of results for the database query.

10. The method of claim 8, wherein the database query includes a join, analyzing the second portion of the column includes determining a measure of correlation of the column with another column of the table of the database that is permanently related to the column, and the characteristic related to a number of rows of the set of results for the database query includes an expected join count related to the number of rows.

* * * * *